Aug. 26, 1952        W. A. HUELSDONK        2,608,299
        ROTARY DRUM CONCENTRATOR AND AMALGAMATOR FOR
                    RECOVERY OF PRECIOUS METALS
Filed Dec. 2, 1946                              3 Sheets-Sheet 1

INVENTOR.
Wm A. Huelsdonk

ATTORNEYS

Aug. 26, 1952     W. A. HUELSDONK     2,608,299
ROTARY DRUM CONCENTRATOR AND AMALGAMATOR FOR
RECOVERY OF PRECIOUS METALS

Filed Dec. 2, 1946     3 Sheets-Sheet 3

INVENTOR.
Wm. A. Huelsdonk
BY
Corbett & Corbett
ATTORNEYS

Patented Aug. 26, 1952

2,608,299

UNITED STATES PATENT OFFICE 2,608,299

ROTARY DRUM CONCENTRATOR AND AMALGAMATOR FOR RECOVERY OF PRECIOUS METALS

William A. Huelsdonk, Boise, Idaho, assignor, by direct and mesne assignments, of one-third to A. M. Phippen, Johnson City, Tenn., one-sixth to Frank J. Smith, Miami Beach, Fla., and one-sixth to Martha E. Boardman, Philadelphia, Pa.

Application December 2, 1946, Serial No. 713,487

10 Claims. (Cl. 209—200)

This invention relates to concentrators for recovering the precious metal contents of gravel and the like, my principal object being to provide a concentrator so constructed that it is particularly effective for recovering free gold, platinum, diamonds, mercury and other precious values in fine particles such as are frequently encountered in gravel and similar deposits and which, being extremely hard to save, is often lost with the tailings when the usual washing methods are employed.

A further object is to provide a concentrator having a large capacity but which is simpler and cheaper to construct than other concentrators of similar capacity.

These and other objects are accomplished by means of such structure and relative arrangement of parts as will fully appear by a perusal of the following specification and claims.

Figure 1:
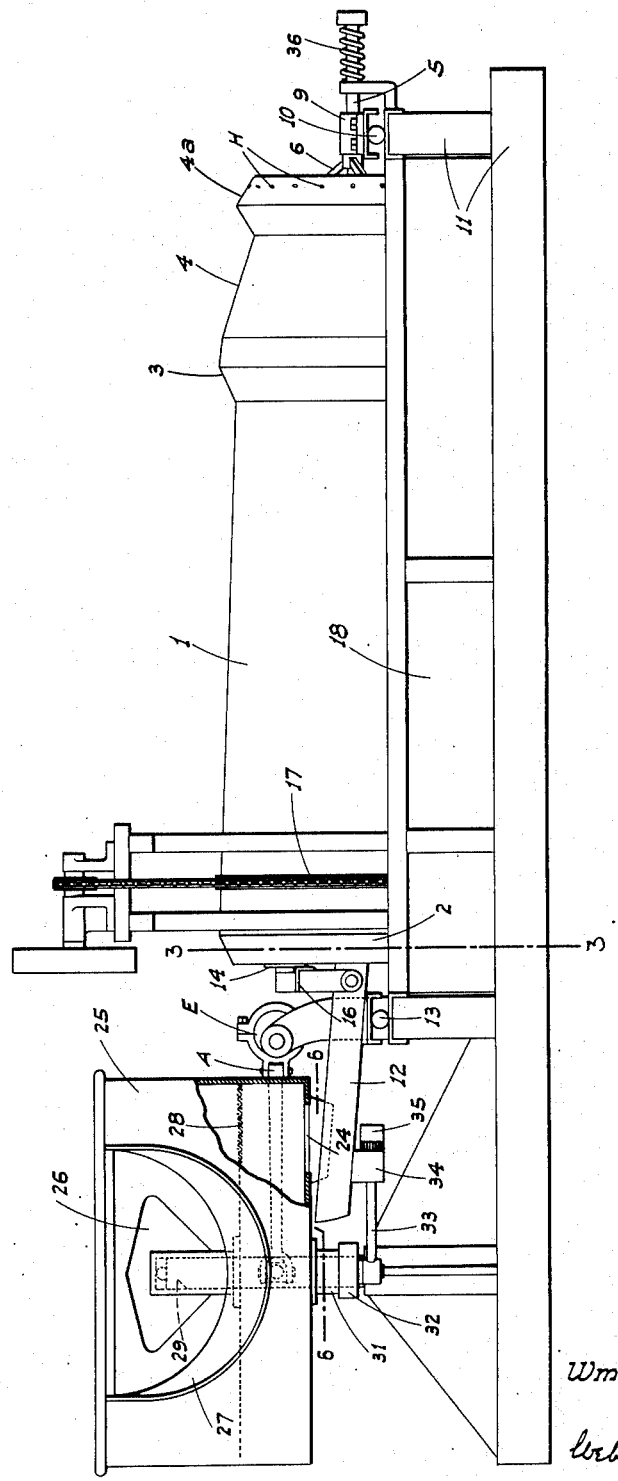
Fig. 1 is a side elevation of the concentrator shown in connection with a feed screen unit, which is partly in section.

Referring now more particularly to the characters of reference on the drawings, the concentrator comprises a relatively long open-ended drum 1 of generally cylindrical form but tapering slightly toward its discharge end. At its rear intake end the drum is formed with an inwardly projecting angled stiffening and retaining flange 2 and at its other end with an enlarged annular sump 3, from which an extension wall 4 projects forwardly. This wall is disposed at a somewhat steeper taper or angle than the taper of the drum, and provides an opening at said end of smaller diameter than the adjacent end of the drum proper.

Wall 4 at its forward end discharges into a smaller sump 4a of triangular cross section. Sump 4a has a row of concentrates discharge holes H in its forward side and is provided with an inwardly projecting stop bead B at its forward end, to hold material from discharging over said end.

The drum is disposed so that at the bottom it has an upward slope toward its forward discharge end, and is turnably supported at said end on a fixed substantially horizontal axial shaft 5 by means of a spider 6 in the drum adjacent said end; the shaft having thrust collars 7 on opposite sides of and engaging the hub 8 of the spider. The shaft beyond the drum is clamped in a block 9 which is supported for limited movement lengthwise of the concentrator by a roller bearing 10 or the like mounted in connection with the base or frame structure 11 of the concentrator.

The shaft terminates within the drum and is secured at its inner end on a feed chute 12 intermediate the ends of the latter, said chute sloping downwardly into the drum from the rear end of the same and terminating a short distance back of the sump 3. Outwardly of the rear end of the drum the chute is supported from the frame structure 11 for limited longitudinal movement by a roller bearing 13 or the like of the same nature as the bearing 10.

The drum is turnably supported at its rear end by transversely spaced rollers 14 engaging a circular track 15 disposed in the flange 2 of the drum and thus leaving open spaces for discharge between track 15 and wall 2; said rollers being mounted on a framework 16 supported by and upstanding from the chute. The drum is rotated slowly about the shaft 5 as an axis by suitable means such as a chain drive 17 extending about the same as shown in Fig. 1, and said drum depends for about half its height into a tank 18 supported by the frame structure 11.

Figure 2:
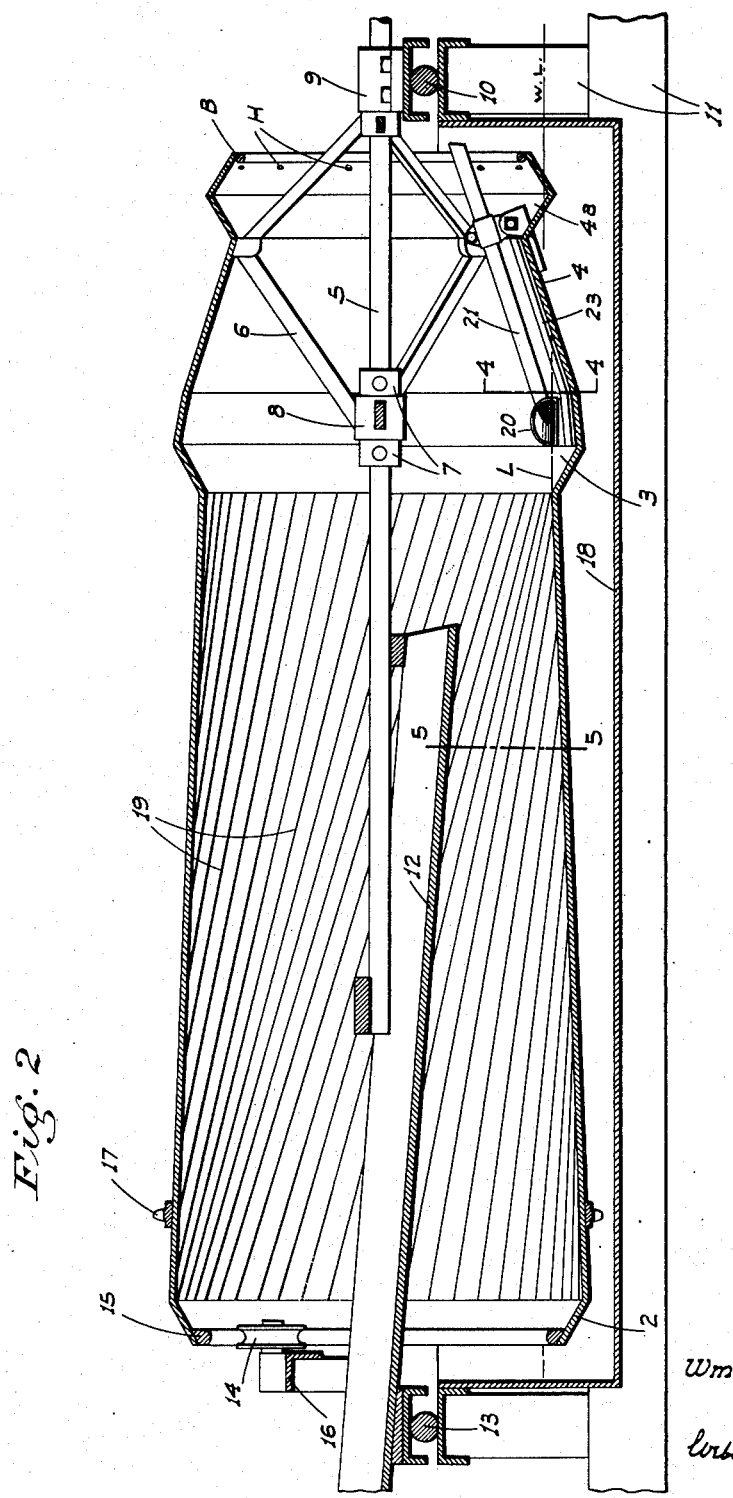
Fig. 2 is a sectional elevation of the concentrator, the riffles being shown diagrammatically.
Figure 3:
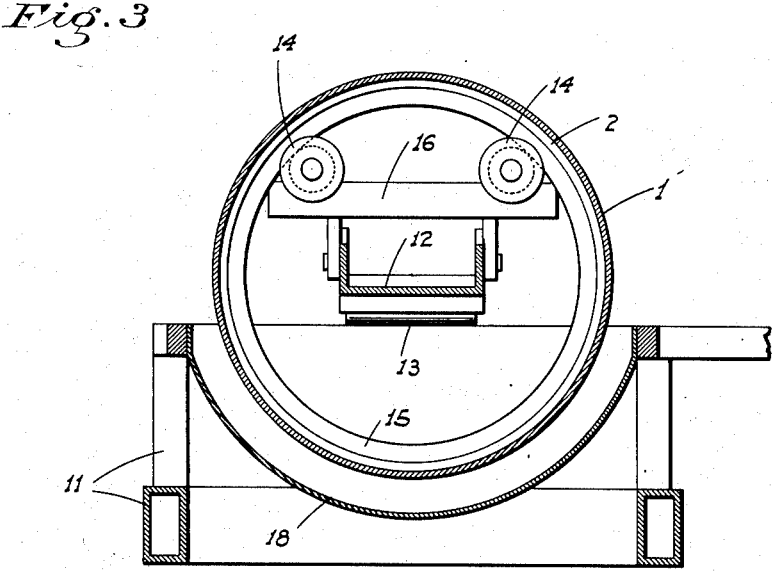
Fig. 3 is a fragmentary transverse section on the line 3—3 of Fig. 1.
Figure 5:
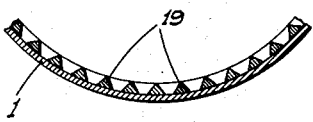
Fig. 5 is a similar view on the line 5—5 of Fig. 2 showing the general form of riffles.
Figure 6:
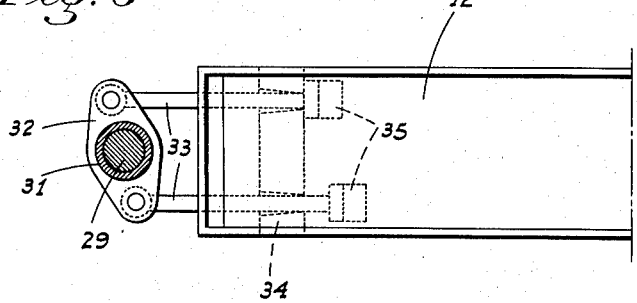
Fig. 6 is a fragmentary sectional plan on the line 6—6 of Fig. 1.

The drum for its full length between the sumps and the flange 2 is provided with riffles 19 of suitable shape, such as that shown in Fig. 5, spaced somewhat closely circumferentially of the drum. These riffles spiral about the drum with a very flat or long pitch, so that each riffle from end to end extends for at least one-quarter of the circumference fo the drum, as indicated in Fig. 2. The pitch of the riffles is such as to be opposed to the direction of rotation of the drum, so that material dropping from the chute tends to be slowly carried by the riffles toward the rear end of the drum. This tendency is counteracted by a longitudinal shaking or jarring movement imparted to the drum by means which will be seen later.

Figure 4:
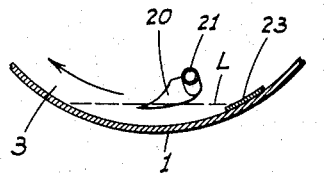
Fig. 4 is a fragmentary cross section on the line 4—4 of Fig. 2, showing the mercury skimming scoop.

The sump 3 is adapted to contain mercury maintained approximately at a certain level, as indicated at L in Figs. 2 and 4. A scoop 20 facing in the direction of rotation of the drum is disposed so as to skim the surface of the mercury and remove unamalgamated material floating thereon once with each revolution of the drum. The scoop is mounted on the drum for rotation therewith by an open arm 21 projecting through an adjustable bracket 22 secured on the adjacent portion of the extension wall 4. This arm forms a conduit open to the scoop which extends along and is substantially parallel to extension 4 and terminates beyond sump 4a, so that when the scoop is inverted or at the top of the drum the arm is disposed with a downward slope, discharging the content previously scooped up into the tank. The bracket is adjustable so that the level of the scoop relative to the mercury may be altered to best suit any particular conditions.

In order to automatically remove hard amalgam from the sump, a copper element 23 is secured on the inner surface of and leads from the sump to the discharge end of wall 4. The lower inner end of this element passes through the mercury once with each revolution of the drum, and any hard amalgam with which the element comes in contact tends to cling to and travel along the element out of the sump clear of the mercury, where the amalgam can be readily removed by the operator, or may fall into the sump 4a. Although element 23 is here shown as a strip, it may be a liner for the adjacent portion of the sump.

The chute or feed trough 12 projects some distance back from its support 13 and receives from the bottom outlet 24 of a cylindrical vertically disposed hopper 25. This hopper has opposed intake and outlet openings 26 and 27, respectively, well above the bottom of the hopper, and a horizontal screen 28 thereon a short distance below said openings. The hopper is mounted for rotation on a fixed vertical spindle 29 upstanding from the frame structure 11, and is oscillated through a short arc so as to provide an agitating or shaking action. This is done by suitable means such as a driven eccentric E having a horizontal arm A connected to the hopper on one side, as indicated in Fig. 1. This agitation or shaking of course functions to cause the relatively fine material on the screen, as fed into the hopper from the intake 26, to pass through the screen and be delivered to the chute; any large pieces incapable of passing through the screen moving on through the outlet 27. The chute and drum as a unit are shaken in a longitudinal direction, preferably from the oscillating hopper, by the following means:

Secured on the depending hub 31 of the hopper, at a level below the adjacent end of the chute, is a short double-ended rocker arm 32, extending diametrally of the hub in a direction transversely of the chute. Rods 33 are connected to the ends of the arm and project under the chute and through guide blocks 34 thereon, the rods having cushioned heads 35 to alternately engage the face of the blocks furthest from the rocker arm upon oscillating movement of the latter. The shaking mechanism is arranged so that short sharp jerks in the direction of the hopper are intermittently imparted to the chute and consequently to the drum, the latter being returned to its initial position after each shaking movement by a spring 36 applied to the shaft 5 at the discharge end of the drum, as shown in Fig. 1.

In operation, the gravel, etc., together with a certain amount of water, is delivered into the hopper, from which the finer content drops into the chute, together with some water, and travels down the chute until it drops into the drum between the riffles. With the steady slow rotation of the drum (at approximately 16 R. P. M.) the riffles tend to convey the material toward the rear end of the drum, while at the same time causing the material to be lifted and tumbled about the drum. Due to the sudden and jerky shaking movements imparted to the drum, as previously described, the heavy values in the material are gradually "kicked" or advanced along the drum in opposition to the tendency of the riffles to move the material and values therein toward the rear end of the drum, until the values drop into the sump 3, where they contact the mercury and become amalgamated. The lighter waste material of course flows down with the water and ultimately passes out into the tank over the front discharge end of the drum. The scoop continuously skims the surface of the mercury, and maintains the same in a clean condition so as not to interfere with the desired and necessary amalgamating action.

Values remaining unamalgamated in sump 3 pass into sump 4a where the main amalgamation takes place; this sump also containing mercury so that the amalgam forms in the shape of a round loose ball.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A concentrator including a rotary drum disposed with its axis substantially horizontal, an annular collecting sump in the drum adjacent its forward end, said sump having mercury therein, means to feed material into the drum back from the sump, means to cause the material to pass to the sump, and a scoop mounted in the drum to recurringly skim the material from the surface of the mercury upon rotation of the drum; there being a conduit connected to the scoop arranged to receive the contents thereof and discharge such contents clear of the drum once with each revolution of the drum.

2. A structure as in claim 1, with means mounting the scoop for adjustment radially of the drum.

3. A concentrator including a rotary drum disposed with its axis substantially horizontal, an annular collecting sump in the drum adjacent one end, said sump having mercury therein, means to feed material into the drum ahead of the sump, means acting on the drum to cause the material to pass to the sump and a copper element providing a flat surface, secured in the drum and extending lengthwise thereof from the bottom of the sump at a converging slope to the axis of the drum to a termination at said adjacent end of the latter.

4. A concentrator including a rotary drum disposed with its axis substantially horizontal, an annular collecting sump in the drum adjacent one end, a fixed axial shaft for the drum, means supporting the shaft beyond said one end of the drum for limited longitudinal movement, means turnably mounting the drum adjacent said end on the shaft, a material feed chute projecting lengthwise into the drum from the other end thereof, means connecting the shaft and chute as a rigid unit within the drum, means supporting the chute outwardly of said other end of the drum for longitudinal movement, means turnably supporting the drum adjacent said other end from the chute while maintaining the drum and chute against longitudinal movement relative to each other, and means to recurringly agitate the drum lengthwise.

5. A structure as in claim 4, in which said last named means comprises a driven rocker arm ahead of and below the chute, a rod projecting from the arm, a guide block on the bottom of the chute through which the rod slidably extends, a head on the rod intermittently engaging the block on one face with rocking movements of the arm and a spring acting on the shaft to move the shaft, chute and drum in a direction opposite to that imparted thereto by said head.

6. A concentrator comprising a main frame which includes spaced apart supporting members, a drum open at both ends, a material delivery feed chute projecting from a point outside and through one open end of the drum to a point within the drum intermediate its ends, roller means supporting the chute for back and forth movement on one of said supporting members, a shaft fixed to the chute within the drum and projecting out through the other open end, a supporting bracket member for said shaft, roller means supporting said bracket member for back and forth movement on the other supporting member, the drum being turnably mounted at one end on the shaft, rollers supported from the chute, the drum being rotatably mounted at its other end on said rollers, metal concentrating means arranged within the drum, and drive means operative to impart reciprocating movement to the feed chute, shaft and drum.

7. A structure as in claim 6, including means associated with the shaft and normally yieldably resisting the reciprocating movement thereof in one direction.

8. A concentrator comprising a rotary drum disposed with its axis substantially horizontal, means to deliver material into the drum at a point intermediate its ends, an annular mercury containing sump on the drum adjacent its forward end to receive the material from the latter, long-pitch spiral riffles in the drum arranged relative to the direction of rotation of the drum so as to tend to slowly move the material as delivered into the drum toward the rear end of the drum, and means to recurringly impart sharp longitudinal jerking movements to the drum in the direction of its rear end.

9. A concentrator including a rotary drum disposed with its axis substantially horizontal, an annular collecting sump in the drum adjacent its forward end, said sump having mercury therein, means to feed material into the drum back from the sump, means to cause the material to pass to the sump, an annular wall of substantial length axially of the drum extending forwardly from the forward end of the sump in converging relation to the axis of the drum, and a second annular mercury containing sump about the forward end of said converging wall.

10. A concentrator including a rotary drum disposed with its axis substantially horizontal, an annular collecting sump in the drum adjacent one end, means to discharge material into the drum between the sump and the other end of the drum, riffles in the drum engaging the material, said riffles being closely spaced about the circumference of the drum, the latter being relatively long and the riffles extending spirally therein on a long, less than full turn pitch from adjacent the sump to adjacent said other end, the spiral of the riffles being opposed to the direction of rotation of the drum so that the material tends to be conveyed toward said other end of the drum, and means acting on the drum to impart recurring forceful longitudinal jerking motion to the drum in the direction of said other end whereby to cause the material to advance toward the sump.

WILLIAM A. HUELSDONK.

REFERENCES CITED

The following references are of record in the file of this patent:

UNITED STATES PATENTS

| Number | Name | Date |
|---|---|---|
| 287,840 | Marby | Nov. 6, 1883 |
| 1,340,457 | Newton | May 18, 1920 |
| 1,418,523 | Broadley | June 6, 1922 |
| 2,064,554 | Mahoney et al. | Dec. 15, 1936 |
| 2,083,674 | Smith | June 15, 1937 |
| 2,424,367 | Nicol | July 24, 1947 |

FOREIGN PATENTS

| Number | Country | Date |
|---|---|---|
| 496,233 | Germany | Apr. 16, 1930 |